(12) United States Patent
Huang et al.

(10) Patent No.: US 6,717,659 B2
(45) Date of Patent: Apr. 6, 2004

(54) METHOD AND APPARATUS FOR DETECTING AIRLINES IN OPTICAL FIBERS

(75) Inventors: Haiying Huang, Atlanta, GA (US); James Hudson, Norcross, GA (US); Siu-Ping Hong, Alpharetta, GA (US); Ronald Lamar Adams, Buford, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/172,359

(22) Filed: Jun. 14, 2002

(65) Prior Publication Data

US 2003/0231296 A1 Dec. 18, 2003

(51) Int. Cl.[7] ............................................. G01N 21/00
(52) U.S. Cl. .................................................... 356/73.1
(58) Field of Search ................................ 356/73.1, 239, 356/430, 237.1; 250/559.42, 559.43; 65/485–491; 385/147, 123

(56) References Cited

U.S. PATENT DOCUMENTS

| | | |
|---|---|---|
| 4,021,217 A | 5/1977 | Bondybey et al. |
| 4,046,536 A | 9/1977 | Smithgall, Sr. |
| 4,501,492 A | 2/1985 | Douklias |
| 4,924,087 A * | 5/1990 | Bailey et al. ............... 356/73.1 |
| 5,185,636 A | 2/1993 | Button et al. |
| 5,786,891 A * | 7/1998 | Jakobsen et al. ......... 356/239.1 |
| 5,880,825 A | 3/1999 | Jakobsen et al. |
| 6,313,909 B1 | 11/2001 | Frazee, Jr. et al. |

OTHER PUBLICATIONS

L.S. Watkins, "Scattering from side–illuminated clad glass fibers for determination of fiber parameters," Jun. 1974, Journal of the Optical Society of America, vol. 64, No. 6, pp. 767–772.

D.H. Smithgall, L.S. Watkins, R.E. Frazee, Jr., "High–speed noncontact fiber–diameter measurement using foward light scattering," Sep. 1977, Applied Optics, vol. 16, No. 9, pp. 2395–2402.

L.I.S. Laser Interferometric Sensor, Optical fiber high speed, high accuracy measurement & control. User's Manual, Jul. 9, 2001.

* cited by examiner

Primary Examiner—Tu T. Nguyen
(74) Attorney, Agent, or Firm—Sutherland Asbill & Brennan LLP (57) ABSTRACT

Defects in optical fibers are detected during manufacturing by using three bandpass filters to separate signals from a scattered light signal produced by a light source in a fiber measurement system. The separated signals include a clad diameter signal, a regular airline signal and a core airline signal. The regular airline signal is compared with the clad diameter signal to produce a normalized regular airline signal, and the core airline signal is compared with the clad diameter signal to produce a normalized core airline signal. The normalized regular airline signal and normalized core airline signal are monitored to determine if they increase, which indicates the presence of a defect in the optical fiber.

27 Claims, 8 Drawing Sheets

METHOD AND APPARATUS FOR DETECTING AIRLINES IN OPTICAL FIBERS

FIELD OF THE INVENTION

The present invention relates generally to methods and apparatuses for detecting defects in optical fibers, and more particularly, to methods and apparatuses for detecting airlines in optical fibers.

BACKGROUND OF THE INVENTION

The ability to detect defects in optical lightguide fibers is critical in providing high quality fiber and in devising manufacturing techniques that minimize the occurrence of such defects. Defects or inhomogenieties can affect the strength or transmission characteristics of the optical fiber. One class of defects, loosely defined as "bubbles" or "airlines", can range from the sub-micron ($\mu$m) to several microns in diameter and multiple-meter lengths. Although the term "airline" is used, defects can take on many different shapes and geometries. Defects over 4 $\mu$m in diameter can cause a variety of problems, including proof test breaks in the manufacturing process and fiber splice problems in the installation process. More importantly, even very small airlines with diameters of less than 1 micron in the core region of the fiber can affect the transmission characteristics of the optical fiber such as loss, polarization mode dispersion (PMD), and Optical Time Domain Reflectometry (OTDR).

Techniques for detecting defects in fibers and, incidentally, dealing with the effects of defects on fiber diameter measurements, are known. See, for example, U.S. Pat. No. 4,046,536, issued Sep. 6, 1977, to D. H. Smithgall (analysis of fringe counts in the presence of "dropouts" resulting from faults in the fiber); U.S. Pat. No. 4,501,492, issued Feb. 26, 1985, to N. Douklias (detection of fiber defects and testing of fiber diameters using a spatial filter prepared using diffracted/scattered light from a defect-free fiber); U.S. Pat. No. 5,185,636, issued Feb. 9, 1993, to L. J. Butten, et. al. (detection of fiber defects using light scattered from a fiber diameter measurement unit and performing Fast-Fourier-Transform (FFT) to examining the spectrum); and U.S. Pat. No. 5,880,825, issued Mar. 9, 1999, to Jakobsen et. al. (detection of fiber defects using light scattered from a fiber diameter measurement unit).

Although these techniques can detect defects in optical fibers, they nonetheless have several significant limitations, including cost and complexity. The added cost and complexity of such methods are due, in large part, to computational requirements and expenses associated with analyzing either the direct image or the frequency spectrum of light scattered signals, for example, performing a FFT on the light scattered signal repeatedly.

U.S. Pat. No. 6,313,909 discloses methods and apparatuses for detecting defects, such as air lines, in optical waveguide fibers. The methods and apparatus employ scattered light interference signals produced by a fiber clad measurement system that transversely illuminates a fiber with a laser beam. Defects in the fiber produce characteristic peaks in the frequency spectrum of the scattered light signal. By filtering the scattered light signal to separate the components associated with the fiber clad measurement system and the fundamental component associated with the fiber, the defect-related components in the scattered light signal which represent defects in the associated fiber are determined. Once the presence of these defect-related components is determined, a defect detection output pulse is generated for each such event. Although the '909 patent uses the fiber's frequency spectrum of a scattered light signal to identify defect-related components, the detector does not differentiate between airlines in a fiber core region from airlines in the overclad region. Additionally, the '909 patent fails to disclose or teach how to dynamically adjust thresholds for the defect detection. Moreover, the system of the '909 patent utilizes a low frequency signal as reference signal, which is not a robust indication of signal strength variations due to fiber vibration, different fiber draw towers, and different clad diameter measurement systems.

With increased market competition and heightened customer expectations, it has become important to develop a low-cost method to detect defects in optical fiber as it is drawn in the manufacturing process and deal with such defects in the fiber accordingly.

BRIEF SUMMARY OF THE INVENTION

The presence of an airline or defect increases the signal strength within scattered light interference signals produced by a fiber clad measurement system that transversely illuminates a fiber with a laser beam, and more particularly, within the frequency bandwidth where the airline peak appears. However, because the overall scattered signal strength also fluctuates as the fiber vibrates during the draw process, it is difficult to determine whether the increase of signal strength alone is due to airline or fiber movement. The present invention solves this problem by using the signal around the clad diameter peak as a reference signal because an airline has little impact on the clad diameter signal while the vibration of the fiber affects both the clad signal and the airline signal. As a result, the normalized regular airline signal, which is defined as the ratio between the regular airline signal strength (from airlines outside of the core or in the overclad region) and the clad diameter signal strength, and the normalized core airline signal, which is defined as the ratio between the core airline signal strength and the clad diameter signal strength, remain the same even though the fiber vibrates. Thus, the increase of the normalized regular airline signal and the normalized core airline signal is a clear indication of the presence of a regular airline and a core airline, respectively.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The principles of the present invention are particularly useful with a lightguide fiber clad diameter measurement system in a fiber drawing device in which a transparent filament, such as a glass fiber, is drawn from an optical rod and the freshly drawn fiber is continuously inspected by the fiber clad diameter measurement system. The operation of lightguide fiber clad diameter measurement systems is based upon the interference to light rays which are either reflected from the surface of the fiber or refracted through the fiber when the fiber is illuminated normal to its axis with a laser beam. For further details see an article written by L. S. Watkins, entitled "Scattering From Side-Illuminated Glass Fibers for the Determination of Parameters," published in the Journal of the Optical Society of America, Vol. 64, June 1974, pp 767–772. Such fiber clad diameter measurements have been implemented in fiber measurement gauges, hereinafter "FM gauges." The so-called fiber clad diameter of an optical fiber is the outer diameter of the fiber and FM gauge measures the fiber clad diameter from a laser-generated scattered light signal that is representative of the fiber clad diameter which is detected by a scanned diode array. In particular, the FM gauge consists of an electronic signal processing unit and an optics unit containing the laser and detection electronics located on the draw tower that measures the fiber clad diameter. FM gauges are further described in an article written by D. H. Smithgall, L. S. Watkins and R. E. Frazee, entitled "High Speed Noncontact Fiber Diameter Measurement Using Forward Light Scattering," published in Applied Optics, Vol. 16, September, 1977, pp. 2395–2402.

Figure 1:
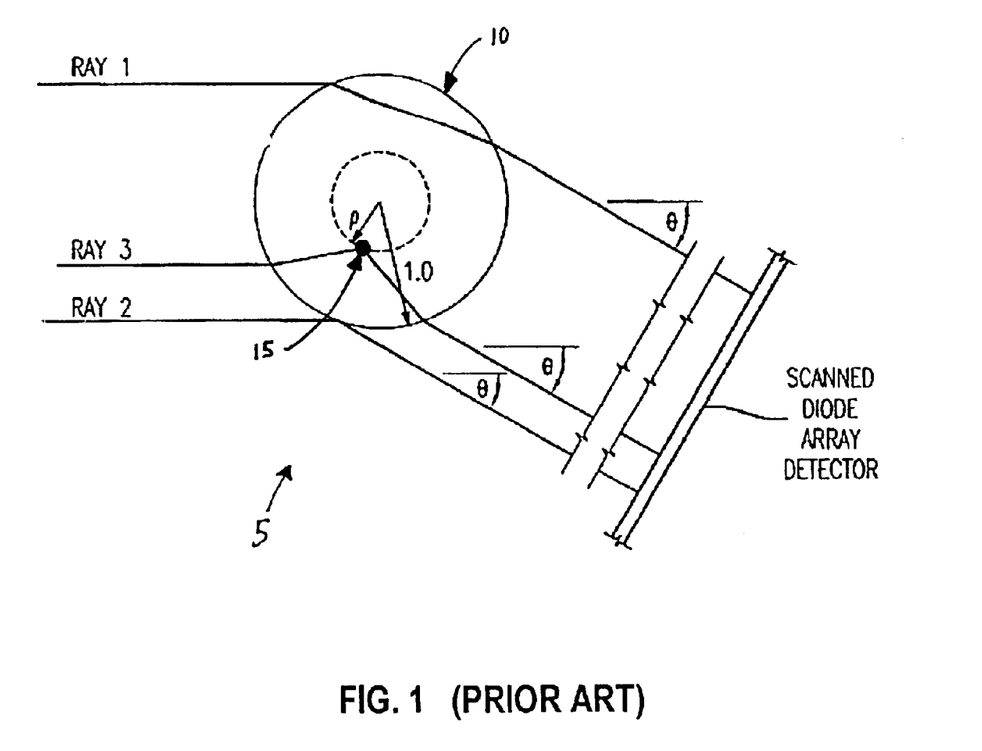
FIG. 1 shows a ray trace model of an optical fiber.

The defect detection technique of the present invention, like the aforementioned prior art defect detection schemes, involves using a scattered light signal generated by launching light rays into a fiber normal to its axis, as noted above. FIG. 1 shows a ray trace 5 of an optical fiber 10 having an airline defect 15. In the fiber 10 of FIG. 1, incoming light rays which do not encounter or impinge on any defects, such as light rays 1 and 2, are scattered and interfere with each other. The fiber 10 has particular interference characteristics and the scattered light signal is a function of those characteristics. In particular, as will be understood by persons skilled in the art, in an ideal fiber, the so called "far field" light from rays 1 and 2 is detected at an angle θ (other angles can be used) to generate the scattered light signal. The fiber clad diameter is determined from the phase characteristics of the scattered light signal. There is also amplitude modulation in the scattered light signal resulting from the modal structure of the laser, optics in the detection unit, and defects in the fiber.

Figure 2:
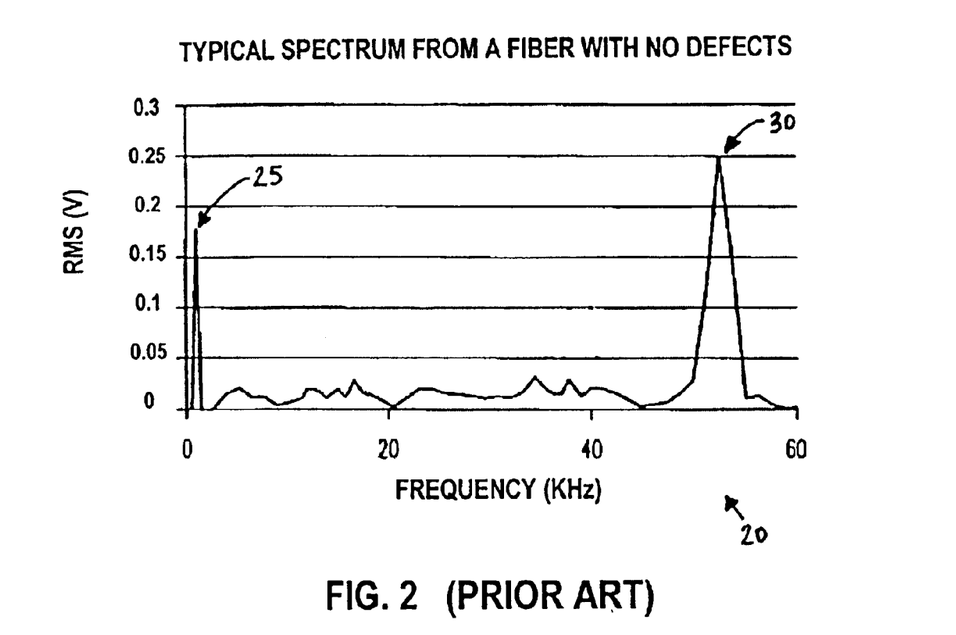
FIG. 2 shows the frequency spectrum of a prior art scattered light signal relating to a fiber containing no defects.

As illustrated in FIG. 2, a typical frequency spectrum 20 of a defect-free fiber contains two major components, which are represented in the frequency spectrum as two strong peaks 25, 30. The first peak 25, for example, near 1.2 KHz, is the result of the scan repetition rate of the diode array used to gather samples of the scattered light signal. The second peak 30, for example, near 54 KHz for a scan rate of 1.2 Khz, is the fundamental component associated with clad diameter measurement that depends upon a number of factors including the optical design of the system and the clad diameter of the fiber. The two components 25, 30 of the scattered light signal are hereinafter collectively referred to as the fiber diameter measurement components, and the second peak component is referred to as the clad diameter signal. Since the frequency spectrum 20 of the scattered light signal is directly related to the scan rate of diode array, it should be appreciated that the diode array scan rate for all the frequency spectrums and frequency components described herein is 1.2 KHz, though it will be appreciated that this scan rate is for illustrative purposes only and that the scan rate can be changed. Therefore, the systems and methods of the present invention can be applied to arbitrary scan rates of a diode array.

A defect or inhomogeniety and, in particular, an airline in the fiber, affects both the amplitude and the phase characteristics of the scattered light signal. Although a defect distorts the phase characteristics of the scattered light signal, such changes in phase are difficult to measure and characterize. Consequently, phase measurement is not an advantageous technique for detecting defects in the fiber. However, identifying characteristic changes in the amplitude of the scattering pattern, by contrast, provides a good way of monitoring defects in the fiber. Because an airline or other defect introduces amplitude modulation in the scattered light signal, additional spectral components appear therein. For example, referring again to FIG. 1, an airline 15 is shown and the location of the airline is represented by a distance p from the center of the fiber. An additional ray, ray 3, impinging on the airline 15, is refracted through the fiber 10 and will interfere with the first two rays. The far field light of the refracted rays is detected at an angle θ to generate a scattered light signal.

Figure 3:
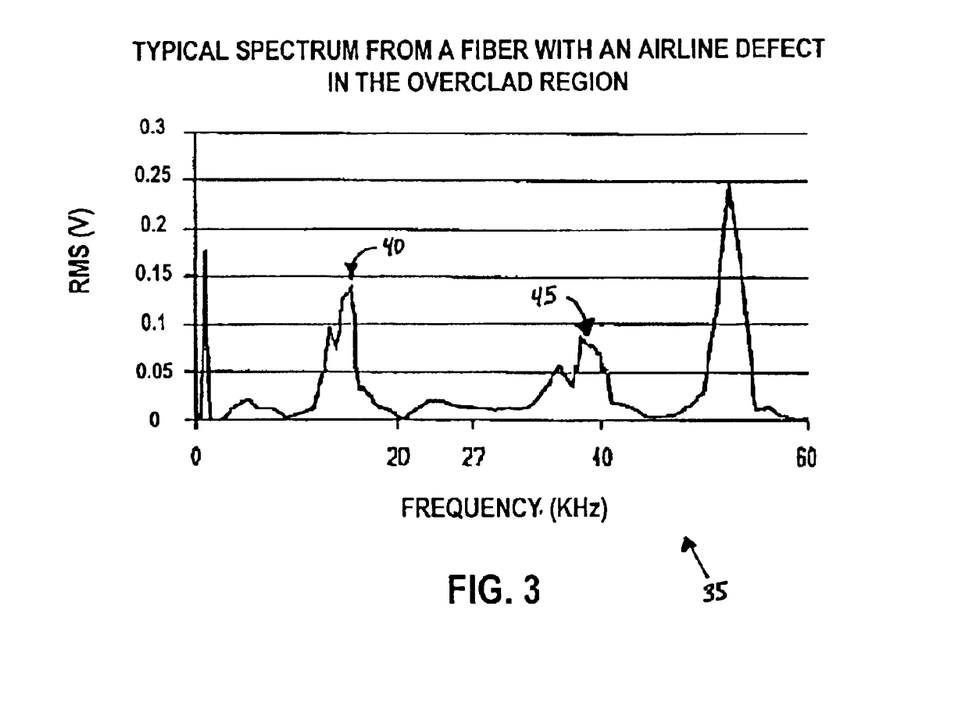
FIG. 3 shows the frequency spectrum of a scattered light signal relating to a fiber containing an airline defect in the overclad region, according to an illustrative example of the present invention.

FIG. 3 shows a frequency spectrum 35 of a scattered light signal computed from a fiber sample containing an airline defect in an overclad region of the optical fiber, according to one illustrative example of the present invention. An airline in the overclad region usually generates two peaks 40, 45 that are symmetric about 27 KHz. The interference of rays 1 and 3, and the interference of rays 2 and 3 create the two additional peaks 40, 45, which are located between the aforementioned two fiber diameter/measurement system components. In the illustrative example of FIG. 3 the two peaks 40, 45 are at around 15 KHz and 39 KHz, respectively. The additional peaks 40, 45 signify an airline, where the location of the peaks is related to the distance between the airline and the fiber center. The magnitudes of the airline peaks 40, 45, however, are related to the size of the airline.

Figure 4:
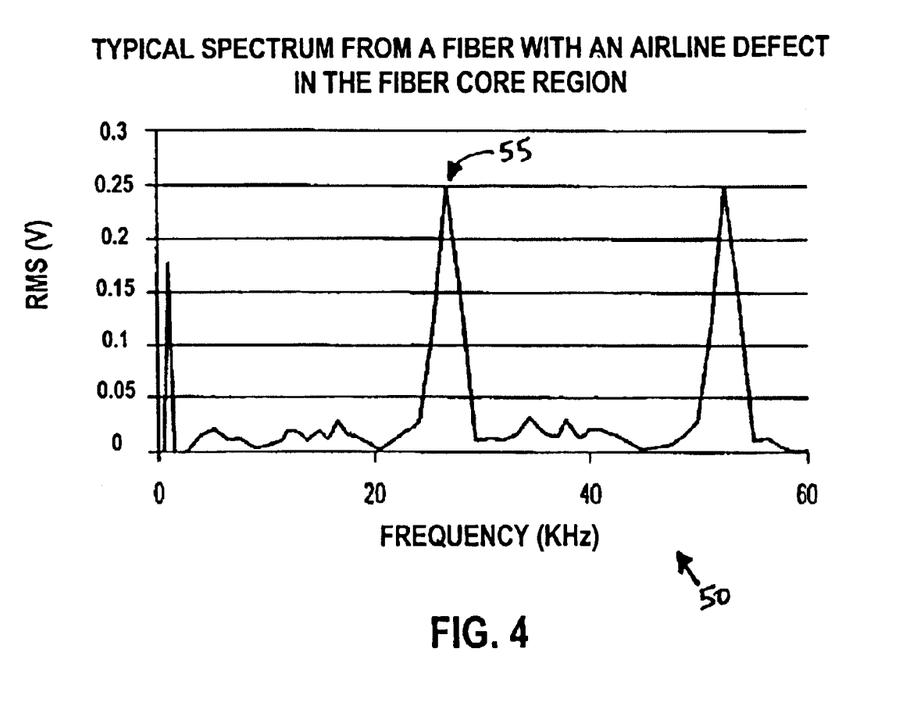
FIG. 4 shows the frequency spectrum of a scattered light signal relating to a fiber containing an airline defect in the fiber core region, according to an illustrative example of the present invention.

FIG. 4 shows a frequency spectrum 50 of a scattered light signal computed from a fiber sample containing an airline defect in the fiber core region of the optical fiber, according to another illustrative example of the present invention. An airline in the fiber core region usually generates a single peak 55 around 27 KHz, as is shown in FIG. 4. This characteristic is applied to differentiate airlines in the core region from airlines located in the overclad region of the fiber, wherein the latter are often referred to as regular airlines. In general, airlines in either the core region or the overclad region are referred to as regular airlines.

As illustrated in FIGS. 3 and 4, the presence of an airline or defect increases the signal strength within the frequency bandwidth where the airline peak appears. However, because the overall scattered signal strength also fluctuates as the fiber vibrates during the draw process, it is difficult to determine whether the increase of signal strength alone is due to airline or fiber movement. The present invention solves this problem by using the signal around the 50–60 KHz region, the clad diameter peak (see, e.g., reference 130 in FIG. 6), as a reference because an airline has little impact on the clad diameter signal while the vibration of the fiber affects both the clad signal and the airline signal. As a result, the normalized regular airline signal, which is defined as the ratio between the regular airline signal strength and the clad diameter signal strength, and the normalized core airline signal, which is defined as the ratio between the core airline signal strength and the clad diameter signal strength, remain the same under normal circumstances (no airline) even though the fiber vibrates. In the prior art, this signal would increase due to the vibration even though no airline was present. Thus, an increase in the normalized regular airline signal or the normalized core airline signal or both can be a clear indication of the presence of a regular airline or core airline, or both, respectively.

Figure 5:
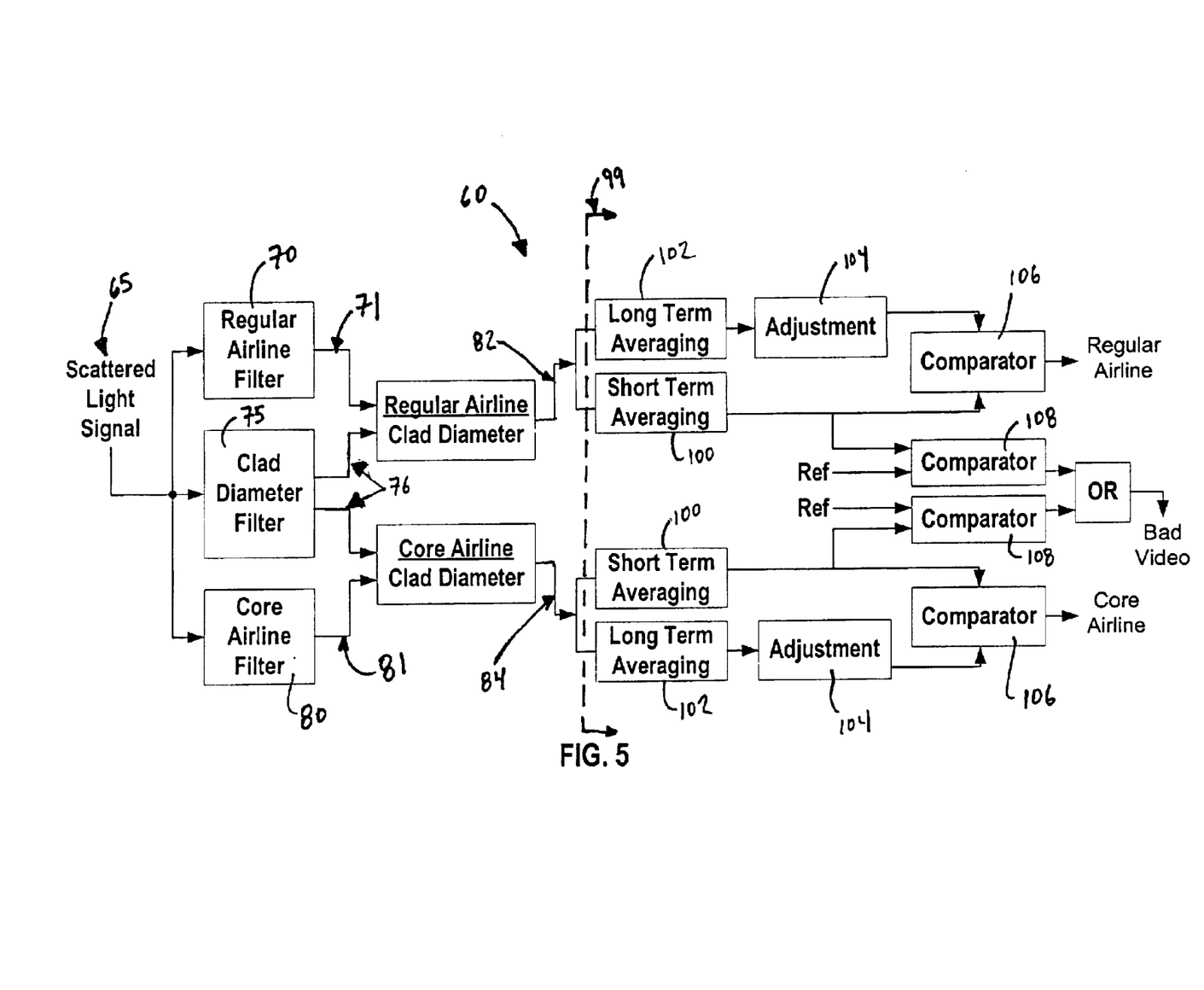
FIG. 5 is a block diagram of a defect detection device in accordance with one embodiment of the present invention.

In accordance with one aspect of the present invention, defects in a fiber are determined by the detection device 60 illustrated in FIG. 5. It should be appreciated that the blocks illustrated in FIG. 5 can be implemented by hardware and/or software, including special purpose hardware-based computer systems that perform the specified functions or steps, or combinations of special purpose hardware and computer instructions. Computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by special purpose hardware-based computer systems that perform the specified functions or steps, or combinations of special purpose hardware and computer instructions.

The detection device 60 of FIG. 5 includes three filters, including a regular airline filter 70, a clad diameter filter 75, and a core airline filter 80, each of which are bandpass filters. The regular airline filter 70 has a filter band of approximately 10 to 42 KHz, the core airline filter 80 has a filter band of approximately 24 to 30 KHz, and the clad filter 75, which filters the reference signal noted above, has a filter band of approximately 48–60 KHz. As will be appreciated by those of ordinary skill in the art, the filters 70, 75, 80 may also be implemented by digital signal processing rather than through hardware components. As illustrated in FIG. 5, the detector 60 receives a scattered light signal 65 from the clad diameter measurement gauge, which could be a Fiber Optic Characterization by Scattering Light (FOCSL) gauge or a similar device. The scattered light signal 65 is then passed through the three bandpass filters 70, 75, 80 described above in order to separate the scattered light signal 65 into a core airline signal 81, regular airline signal 71, and clad diameter signal 76. As shown in FIG. 5, the regular airline signal 71 is separated by the regular airline filter 70, the clad diameter signal 76 is separated by the clad filter 75, and the core airline signal 81 is separated by the core airline filter 80.

Figure 6:
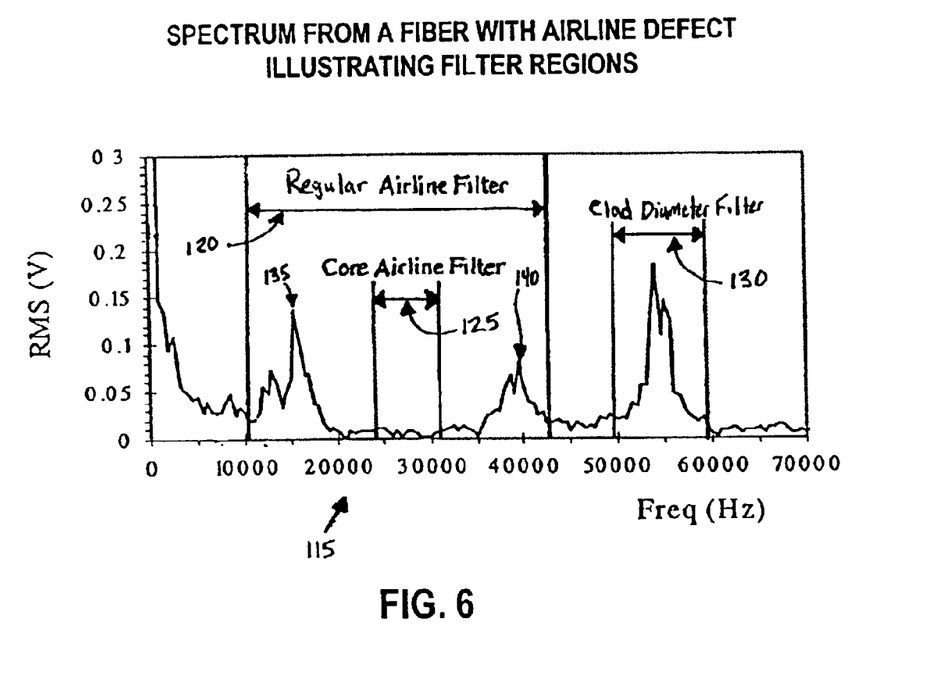
FIG. 6 shows the location of the three filter bands of the filters of FIG. 5 in relation to a frequency spectrum of a scattered light signal containing an airline defect in an overclad region, according to one aspect of the present invention.

FIG. 6 shows the location of the three filter bands of the filters 70, 75, 80 of FIG. 5 in relation to a frequency spectrum 115 of a scattered light signal containing an airline defect in an overclad region, according to one aspect of the present invention. As shown in FIG. 6, the overclad airline filter 70 has a bandpass filter band 120 that includes the two peaks 135, 140 typical of an airline in the overclad region, as in FIG. 3. The core airline filter 80 has a bandpass filter band 125 centered about approximately 27 KHz, for identifying any defects, such as airlines, in the core region. Although no such core region defects are illustrated in the illustrative frequency spectrum 115 of FIG. 6, the core airline filter 80 isolates a peak signal near 27 KHz, such as the signal surrounding peak 55 in the signal spectrum of FIG. 4. Finally, FIG. 6 shows a bandpass filter band 130 corresponding to the clad filter 75 of FIG. 5. The filter band 130 separates the fundamental component associated with clad diameter measurement in an otherwise defect-free optical fiber.

Referring again to FIG. 5, after the scattered light signal 65 is passed through the respective filters 70, 75, 80, the resulting signals 71, 76, 81 are processed to achieve the normalized regular airline signal 82 and the normalized core airline signal 84 described above. The detection device 60 then processes each of the signals 82, 84 using an identical processing procedure, as is evidenced by the partially symmetrical nature of the block diagram of FIG. 5. According to one embodiment of the present invention, the components to the right of dashed line in FIG. 5 comprise the normalized airline signal monitor 99 of the detection device 60. Therefore, processing by the detection device 60 of both the normalized regular airline signal 82 and the normalized core airline signal 84 are discussed below with reference to a normalized airline signal, which represents, independently, the normalized regular airline signal 82 and the normalized core airline signal 84.

Both the short-term average 100 and the long-term average 102 of the normalized airline signal are calculated as data points as signals are acquired into the detection system 60. The long-term average 102 of the normalized airline signal serves as an indication of the normal value of the normalized airline signal for a fiber without airlines, which can be different from different towers, different clad diameter measurement systems, and different preforms from which the fibers are drawn. Using this normal value of the normalized airline signal as a reference level can compensate the differences among various draw towers, clad diameter measurement systems, and the preform types. According to one preferred embodiment of the present invention, the time period in which the long-term average is calculated should be long enough so that an airline of several hundred-meter length will not affect the long-term average value significantly. Additionally, according to one aspect of the present invention, the long term average of the normalized airline signal can be used as a reference to dynamically adjust the defect detection threshold, discussed below, where the threshold may be continuously altered on a real time or near real time basis.

If an airline is presented in the fiber, the short-term average 100 of the normalized airline signal will increase due to the reasons mentioned above, primarily, the increase in the signal strength in a filtered frequency band due to the presence of a fiber defect. Consequently, the short-term average 100 of the normalized airline signal serves to indicate the presence of an airline. For a perfect fiber, i.e. fiber without airlines, the short-term average 100 and the long-term average 102 of the normalized airline signal should be relatively close to each other within a certain predefined range. On the other hand, when an airline is presented in the fiber, the short-term average 100 of the normalized airline signal increases and is thus larger than the long-term average 102 of the normalized airline signal. If the ratio between the short-term average 100 and the long-term average 102 of the normalized airline signal exceeds a set default detection threshold, as determined by a comparator 106, the detection device 60 will output an indication that an airline is present. Additionally, according to one aspect of the present invention, the threshold can be adjusted. This adjustment may be implemented by one or more inputs not illustrated in FIG. 5, or via the adjustment component 104 that enables an operator-implemented or automated program to set the threshold and therefore, sensitivity of the detection system 60. The lower the threshold, the higher the sensitivity of the detection device 60. In addition, the practice of applying short-term averaging to the normalized airline signal reduces the possibility of false indication due to random noise and sporadic noises.

The short-term average 100 of the normalized airline signal is monitored by the device 60 to ensure that the clad diameter measurement system is functioning property. If the short-term average 100 of the normalized airline signal is higher than a reference value for a certain period of time, as is determined by comparators 108, the detection system 60 will provide a bad video output to indicate that the clad diameter measurement system is not working properly. The reference value can be a fixed value or a value related to the long-term average 102 of the normalized airline signal.

Figure 7:
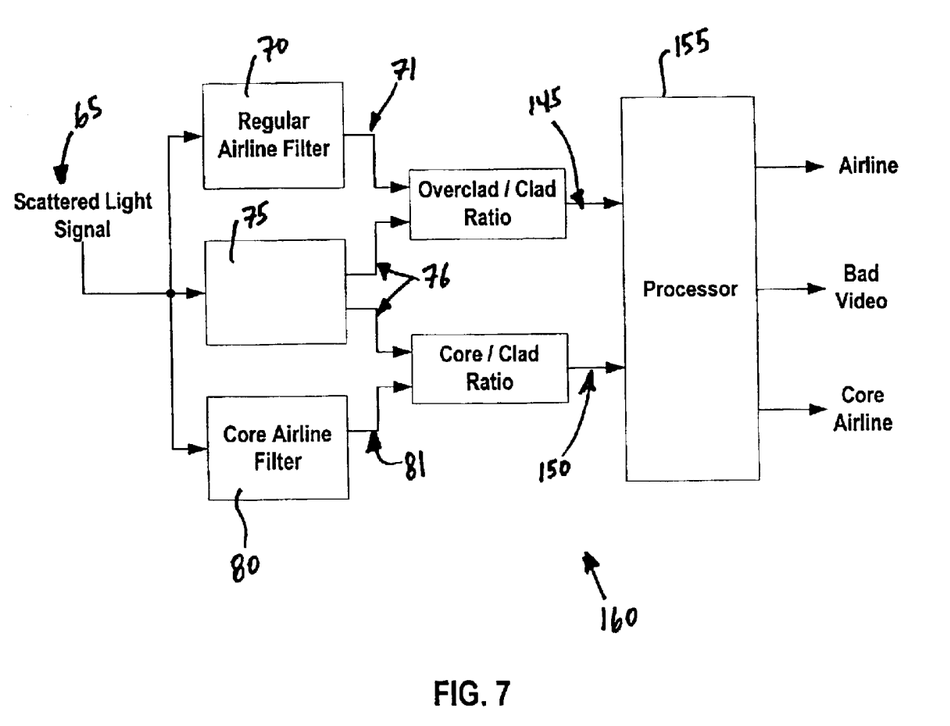
FIG. 7 is a block diagram of a defect detection device in accordance with another embodiment of the present invention.

FIG. 7 is a block diagram of a defect detection device 160 in accordance with another embodiment of the present invention. Like the device 60 of FIG. 5, the detection device 160 of FIG. 7 includes three filters, including an overclad airline filter 70, a clad filter 75, and a core filter 80, each of which are bandpass filters. The overclad airline filter 70 has a filter band of approximately 10 to 42 KHz, the core airline filter 80 has a filter band of approximately 24 to 30 KHz, and the clad filter 75, which filters the reference signal noted above, has a filter band of approximately 48–60 KHz. As in the embodiment of FIG. 5, the detector 160 receives a scattered light signal 65 from the scanned diode array detector of FIG. 1, which, according to one embodiment of the present invention, may be a FOCSL video signal received from a FOCSL diameter gauge. The scattered light signal 65 is then passed through the three bandpass filters 70, 75, 80 in order to separate the scattered light signal 65 into a core airline signal 81, regular (overclad) airline signal 71, and clad diameter signal 76. As shown in FIG. 7, the regular airline signal 71 is separated by the overclad airline filter 70, the clad diameter signal 76 is separated by the clad filter 75, and the core airline signal 81 is separated by the core filter 80.

Next, the ratio 145 between the analog airline signal 71 and clad diameter signal 76, as is the ratio 150 between the core airline signal and clad diameter signal 76. These ratios 145, 150 may be implemented by a signal divider or comparator, as is well known in the art. Next, the ratio is forwarded to the processor 155. According to one embodiment of the invention, the ratios 145, 150 are in analog form when received at the processor 155, at which time they must be converted into digital form by the processor implementing an analog-to-digital (A/D) conversion, as is well known in the art. Alternatively, the A/D conversion may be implemented by one or more A/D converters (not illustrated) that receive the ratios 145, 150 and pass their converted digitized form to the processor 155. According to another embodiment of the invention, the A/D converters may be implemented immediately after the filters 70, 75, 80 such that the ratios are digitally determined. Regardless of the manner in which the A/D conversion is implemented, the processor 155 of FIG. 7 implements the same functions and outputs as the elements of FIG. 5, but for the use of a processor implementing the digital equivalent processes of the hardware present in FIG. 5 after the normalized regular airline signal 82 and the normalized core airline signal 84 (equivalent to ratios 145, 150) are determined. Therefore, according to one embodiment of the invention, the processor 155 comprises the normalized signal monitor 99 of FIG. 5.

Figure 8:
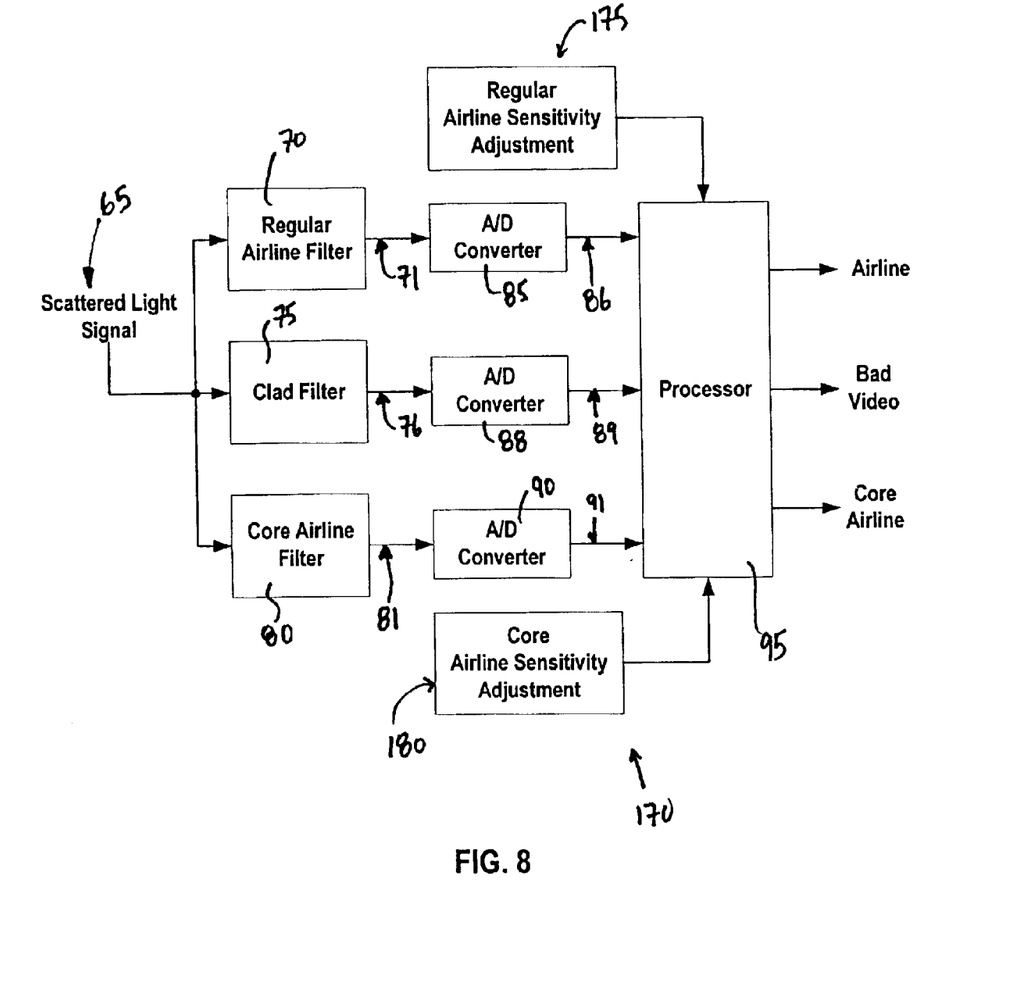
FIG. 8 is a block diagram of a defect detection device in accordance with yet another embodiment of the present invention.

FIG. 8 shows a detection device 170 according to another embodiment of the present invention. According to one aspect of the invention, FIG. 8 illustrates one method of implementing the detection device and process described with reference to FIG. 5. After the scattered light signal 65 is passed through the respective filters 70, 75, 80, the resulting signals 71, 76, 81 are passed through one or more A/D converters 85, 88, 90 for digitization, as is well known to those of ordinary skill in the art. The digitized signals 86, 89, 91 are then transmitted to a processor 95, which represents a microprocessor or processor for implementing one or more executable programs, as is well known in the art. The processor is operable to implement the processing of the signals 71, 76 and 81 as is described in FIG. 5. Therefore, the processor can compute a normalized regular airline signal 82 and a normalized core airline signal 84 and process the signals using the methods discussed with respect to FIGS. 5 and 7. This includes adjusting the sensitivity of the device via adjustments 175, 180 in monitoring for the presence of regular and core airlines, as described in detail with respect to FIG. 5.

Figure 9:
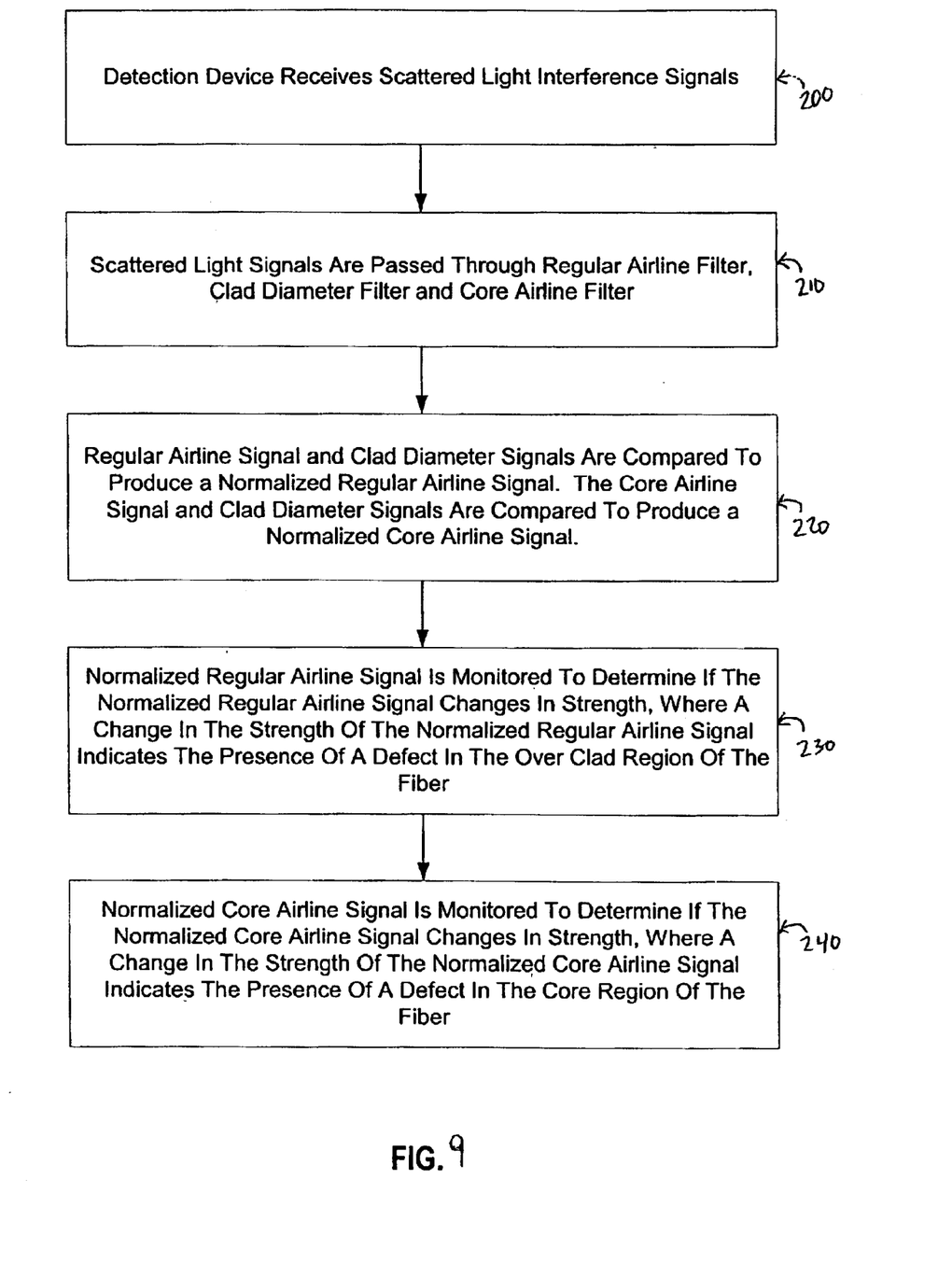
FIG. 9 is a block diagram flow chart illustrating steps implemented by a defect detection device according to one embodiment of the present invention.

FIG. 9 is a block diagram flow chart illustrating steps implemented by a detection device according to one embodiment of the present invention. As illustrated at step 200, the detection device receives scattered light interference signals produced by a fiber clad measurement system that transversely illuminates a fiber with a laser beam. The detection device then passes the scattered light interference signals through a regular airline filter, clad diameter filter, and core airline filter (step 210) to separate the regular airline signal, clad diameter signal and core airline signal. Next, at step 220 the regular airline signal and clad diameter signal are compared to produce a normalized regular airline signal, and the core airline signal and clad diameter signal are compared produce a normalized core airline signal. At step 230 the normalized regular airline signal is monitored to determine if the normalized regular airline signal changes in strength, where a change in the strength of said normalized regular airline signal indicates the presence of a defect in the over clad region of said fiber. Finally, at step 240 the normalized core airline signal is monitored to determine if said normalized core airline signal changes in strength, wherein a change in the strength of said normalized core airline signal indicates the presence of a defect in the core region of said fiber. It should be appreciated that steps 230 and 240 may occur simultaneously. Furthermore, it should be appreciated that although the above steps are illustrative of the steps performed by the devices of FIGS. 5, 7 and 8, each embodiment described herein may include one or more additional steps.

Many modifications and other embodiments of the inventions set forth herein will come to mind to one skilled in the art to which these inventions pertain having the benefit of the teachings presented in the foregoing descriptions and the associated drawings. Therefore, the present invention may be used to detect any defects in an optical fiber, with airline defects being only an example of one type of defect detected by the system, apparatus and method of the present invention. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber defect detection apparatus that receives a scattered light signal produced by a fiber measurement system, comprising:
   at least one comparator, wherein said at least one comparator is operable to compare one of a regular airline signal and a core airline signal with a clad diameter signal to produce a normalized airline signal; and
   a normalized airline signal monitor, wherein said normalized airline signal monitor is operative to monitor said normalized airline signal to determine if said normalized airline signal changes in strength, wherein a change in the strength of said normalized airline signal indicates the presence of a defect in said fiber.

2. The apparatus of claim 1, further comprising a plurality of filters, wherein the plurality of filters separate signals from the scattered light signal, and wherein the separated signals comprise a clad diameter signal and at least one of a regular airline signal and a core airline signal.

3. The apparatus of claim 2, wherein said normalized airline signal monitor is operative to monitor said normalized airline signal to determine if said normalized airline signal increases in strength, wherein an increase in the strength of said normalized airline signal indicates the presence of a defect in said fiber.

4. The apparatus of claim 3, wherein said normalized airline signal monitor is operative to monitor a long term average strength of said normalized airline signal.

5. The apparatus of claim 4, said normalized airline signal monitor is operative to monitor said normalized airline signal against said long term average strength to determine if said normalized airline signal increases in strength, wherein an increase in strength of said normalized airline signal against said long term average strength indicates the presence of a defect in said fiber.

6. The apparatus of claim 5, further comprising an output for indicating the presence of a defect, wherein said normalized airline signal monitor indicates the presence of a defect to said monitor if said normalized airline signal increases in strength above a defect detection threshold.

7. The apparatus of claim 6, wherein said defect detection threshold is dynamically adjusted based at least in part upon said long term average strength.

8. The apparatus of claim 6, wherein said apparatus further comprises a sensitivity adjustment component, and wherein said defect detection threshold is based at least in part upon said sensitivity adjustment component.

9. The apparatus of claim 3, wherein said normalized airline signal monitor is operative to monitor a short term average strength of said normalized airline signal.

10. The apparatus of claim 9, wherein said normalized airline signal monitor is operative to monitor said short term average strength to determine if said short term average strength increases, wherein an increase in said short term average strength indicates the presence of a defect in said fiber.

11. The apparatus of claim 9, wherein said normalized airline signal monitor is operative to compare said short term average strength of said normalized airline signal to a long term average strength of said normalized airline signal to determine if said normalized airline signal increases in strength.

12. The apparatus of claim 9, wherein said normalized airline signal monitor is operative, using said short term average strength, to eliminate a false detection of the presence of a defect in said fiber due to signal noise.

13. The apparatus of claim 3, wherein said normalized airline signal monitor comprises a processor.

14. The apparatus of claim 13, wherein said normalized airline signal monitor comprises and analog to digital (A/D) converter for converting said normalized airline signal to a digital normalized airline signal.

15. The apparatus of claim 2, wherein said at least two filters comprise a regular airline filter, a core airline filter, and a clad diameter filter.

16. The apparatus of claim 15, wherein each of said regular airline filter, a core airline filter, and a clad diameter filter comprise bandpass filters.

17. A method for detecting defects in an optical fiber that includes receiving a scattered light signal produced by a light source in a fiber measurement system, comprising:
   filtering to separate signals from said scattered light signal, wherein the separated signals comprise a clad diameter signal and one of a regular airline signal and a core airline signal;
   comparing said one of a regular airline signal and a core airline signal with said clad diameter signal to produce a normalized airline signal; and
   monitoring said normalized airline signal to determine if said normalized airline signal increases in strength, wherein an increase in strength of said normalized airline signal indicates the presence of a defect is said fiber.

18. The method of claim 17, further comprising the step of identifying when an increase in strength of said normalized airline signal is detected.

19. The method of claim 17, wherein the step of filtering to separate signals from the scattered light signal comprises separating a regular airline signal, a core airline signal, and a clad diameter signal from said scattered signal.

20. The method of claim 17, wherein said step of monitoring said normalized airline signal comprises monitoring a long term average strength of said normalized airline signal.

21. The method of claim 20, wherein the step of monitoring said normalized airline signal comprises comparing said normalized airline signal against said long term average strength to determine if said strength of the normalized airline signal increases, wherein an increase in the strength of said normalized airline signal against said long-term average indicates the presence of a defect in said fiber.

22. The method of claim 21, further comprising outputting an indication of the presence of a defect when said normalized airline signal increases in strength above a defect detection threshold.

23. The method of claim 22, further comprising the step of dynamically adjusting the defect detection threshold based at least in part upon said long term average strength.

24. The method of claim 17, wherein said step of monitoring said normalized airline signal comprises monitoring a short term average strength of said normalized airline signal to determine if said short term average strength increases relative to a monitored long term average strength.

25. A method for manufacturing an optical fiber, comprising:

drawing fiber on a draw tower; and inspecting the fiber for defect, wherein said inspecting step comprises:

filtering to separate signals from the scattered light signal, wherein the separated signals comprise a clad diameter signal, a regular airline signal and a core airline signal;

comparing said one of the regular airline signal and the core airline signal with said clad diameter signal to produce a normalized regular airline signal; and monitoring said normalized regular airline signal to determine if the strength of said normalized regular airline signal increases, wherein an increase in the strength of said normalized regular airline signal indicates the presence of a defect in said fiber.

26. The method of claim 25, wherein said inspecting step further comprises comparing said core airline signal with said clad diameter signal to produce a normalized core airline signal, and wherein said step of monitoring said normalized airline signal further comprises monitoring said normalized core airline signal to determine if the strength of said normalized core airline signal increases, wherein an increase in said strength of said normalized core airline signal indicates the presence of a defect in said fiber.

27. A fiber defect detection apparatus that receives a scattered light signal produced by a fiber measurement system, comprising:

plurality of filters, wherein the plurality of filters separate signals from the scattered light signal, and wherein the separated signals comprise a clad diameter signal, a regular airline signal and a core airline signal;

at least one comparator, wherein said at least one comparator is operable to compare said regular airline signal and said clad diameter signal to produce a normalized regular airline signal, and wherein said at least one comparator is further operable to compare said core airline signal with a clad diameter signal to produce a normalized core airline signal; and a normalized airline signal monitor, wherein said normalized airline signal monitor is operative to:

monitor said normalized regular airline signal to determine if said normalized regular airline signal changes in strength, wherein a change in the strength of said normalized regular airline signal indicates the presence of a defect in the over clad region of said fiber; and monitor said normalized core airline signal to determine if said normalized core airline signal changes in strength, wherein a change in the strength of said normalized core airline signal indicates the presence of a defect in the core region of said fiber.

* * * * *